United States Patent
Dettinger et al.

(10) Patent No.: US 8,370,375 B2
(45) Date of Patent: Feb. 5, 2013

(54) METHOD FOR PRESENTING DATABASE QUERY RESULT SETS USING POLYMORPHIC OUTPUT FORMATS

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1675 days.

(21) Appl. No.: 11/297,302

(22) Filed: Dec. 8, 2005

(65) Prior Publication Data

US 2007/0136262 A1    Jun. 14, 2007

(51) Int. Cl.
*G06F 7/00* (2006.01)
(52) U.S. Cl. ........................................... 707/759
(58) Field of Classification Search .............. 707/3, 759
See application file for complete search history.

(56) References Cited

U.S. PATENT DOCUMENTS

| | | | |
|---|---|---|---|
| 5,471,611 A | 11/1995 | McGregor | |
| 5,734,887 A | 3/1998 | Kingberg et al. | |
| 6,442,543 B1 | 8/2002 | Snodgrass et al. | |
| 6,553,368 B2 | 4/2003 | Martin et al. | |
| 6,725,227 B1 | 4/2004 | Li | |
| 2002/0078068 A1 | 6/2002 | Krishnaprasad et al. | |
| 2003/0172056 A1 | 9/2003 | Dettinger et al. | |
| 2004/0015496 A1* | 1/2004 | Anonsen | 707/4 |
| 2004/0148278 A1 | 7/2004 | Milo et al. | |
| 2004/0267760 A1 | 12/2004 | Brundage et al. | |

OTHER PUBLICATIONS

Dettinger, et al., U.S. Appl. No. 10/083,075, filed Feb. 26, 2002, "Application Portability and Extensibility Through Database Schema and Query Abstraction".
Dettinger, et al., U.S. Appl. No. 10/403,356, filed Mar. 31, 2003, "Dealing with Composite Data Through Data Model Entities".
Dettinger, et al., U.S. Appl. No. 11/005,418, filed Dec. 6, 2004, "Abstract Query Plan".

* cited by examiner

*Primary Examiner* — Etienne Leroux
*Assistant Examiner* — Ajith Jacob
(74) *Attorney, Agent, or Firm* — Patterson & Sheridan LLP

(57) ABSTRACT

A method, apparatus, and article of manufacture for processing a database query. Database queries are submitted with an indication of a selected output format, To process the query, data records are retrieved and formatted according to the selected output format, as well as formatted for additional output formats supported by a given a query application. Once returned, query results may be presented in the selected format. A user may switch the presentation of the query result from the selected format to others, without having to re-execute the database query.

18 Claims, 8 Drawing Sheets

600

| Result Row | ID | Mode | Hemoglobin | H-Date | Glucose | G-Date | Hemoglobin | | | | Glucose | | | | Related Rows |
|---|---|---|---|---|---|---|---|---|---|---|---|---|---|---|---|
| | | | | | | | Hemo | Date | | | Gluc | Date | | | |
| 1 | 1 | 1 | | | | | 30 | 17-Feb | | | 12 | 9-Jan | | | 3-6, 11-14 |
| | | | | | | | 40 | 20-Jun | | | 5 | 12-May | | | |
| | | | | | | | Hemo | Date | | | Gluc | Date | | | 7-10, 16-18 |
| 2 | 2 | 1 | | | | | 33 | 17-Feb | | | 15 | 21-Nov | | | |
| | | | | | | | 34 | 20-Jun | | | 14 | 14-Mar | | | |
| 3 | 1 | 2 | 30 | 17-Feb | 12 | 9-Jan | | | | | | | | | 1, 11, 13 |
| 4 | 1 | 2 | 40 | 20-Jun | 12 | 9-Jan | | | | | | | | | 1, 12, 13 |
| 5 | 1 | 2 | 30 | 17-Feb | 5 | 12-May | | | | | | | | | 1, 11, 14 |
| 6 | 1 | 2 | 40 | 20-Jun | 5 | 12-May | | | | | | | | | 1, 12, 14 |
| 7 | 2 | 2 | 33 | 6-Dec | 15 | 21-Nov | | | | | | | | | 2, 15, 17 |
| 8 | 2 | 2 | 34 | 23-Jul | 15 | 21-Nov | | | | | | | | | 2, 16, 17 |
| 9 | 2 | 2 | 33 | 6-Dec | 14 | 14-Mar | | | | | | | | | 2, 15, 18 |
| 10 | 2 | 2 | 34 | 23-Jul | 14 | 14-Mar | | | | | | | | | 2, 16, 18 |
| 11 | 1 | 3 | 30 | 17-Feb | | | | | | | | | | | 1, 3, 5 |
| 12 | 1 | 3 | 40 | 20-Jun | | | | | | | | | | | 1, 4, 6 |
| 13 | 1 | 3 | | | 12 | 9-Jan | | | | | | | | | 1, 3, 4 |
| 14 | 1 | 3 | | | 5 | 12-May | | | | | | | | | 1, 5, 6 |
| 15 | 2 | 3 | 33 | 6-Dec | | | | | | | | | | | 2, 7, 9 |
| 16 | 2 | 3 | 34 | 23-Jul | | | | | | | | | | | 2, 8, 10 |
| 17 | 2 | 3 | | | 15 | 21-Nov | | | | | | | | | 2, 7, 8 |
| 18 | 2 | 3 | | | 14 | 14-Mar | | | | | | | | | 2, 9, 10 |

*FIG. 6*

| ID | Hemoglobin | | Glucose | |
|---|---|---|---|---|
| 1 | Hemo | Date | Gluc | Date |
|   | 30 | 17-Feb | 12 | 9-Jan |
|   | 40 | 20-Jun | 5 | 12-May |
| 2 | Hemo | Date | Gluc | Date |
|   | 33 | 17-Feb | 15 | 21-Nov |
|   | 34 | 20-Jun | 14 | 14-Mar |

*FIG. 7A*

| ID | Hemoglobin | H-Date | Glucose | G-Date |
|---|---|---|---|---|
| 1 | 30 | 17-Feb | 12 | 9-Jan |
| 1 | 40 | 20-Jun | 12 | 9-Jan |
| 1 | 30 | 17-Feb | 5 | 12-May |
| 1 | 40 | 20-Jun | 5 | 12-May |
| 2 | 33 | 6-Dec | 15 | 21-Nov |
| 2 | 34 | 23-Jul | 15 | 21-Nov |
| 2 | 33 | 6-Dec | 14 | 14-Mar |
| 2 | 34 | 23-Jul | 14 | 14-Mar |

*FIG. 7B*

| ID | Hemoglobin | H-Date | Glucose | G-Date |
|---|---|---|---|---|
| 1 | 30 | 17-Feb | | |
| 1 | 40 | 20-Jun | | |
| 1 | | | 12 | 9-Jan |
| 1 | | | 5 | 12-May |
| 2 | 33 | 6-Dec | | |
| 2 | 34 | 23-Jul | | |
| 2 | | | 15 | 21-Nov |
| 2 | | | 14 | 14-Mar |

*FIG. 7C*

METHOD FOR PRESENTING DATABASE QUERY RESULT SETS USING POLYMORPHIC OUTPUT FORMATS

CROSS-REFERENCE TO RELATED APPLICATIONS

This application is related to the following: commonly assigned, co-pending, U.S. patent application Ser. No. 10/083,075, filed Feb. 26, 2002, titled "Application Portability and Extensibility through Database Schema and Query Abstraction;" commonly assigned, co-pending U.S. patent application Ser. No. 10/403,356, filed Mar. 31, 2003, titled "Dealing with Composite Data through Data Model Entities;" and commonly assigned, co-pending application titled "Abstract Query Plan," Ser. No. 11/005,418, filed Dec. 6, 2004, each of which is incorporated by reference herein in its entirety.

BACKGROUND OF THE INVENTION

1. Field of the Invention

The present invention generally relates to computer database systems. More particularly, the invention relates to methods for processing a database query when the results of a given query may need to be presented in multiple presentation styles, formats, or arrangements.

2. Description of the Related Art

Computer databases are well known systems used to store, maintain, and retrieve data. Generally, a database is a collection of data that is organized in a manner to allow its contents to be easily accessed, managed, and updated. The most prevalent type of database used today is the relational database, which organizes data using tables, and relationships between tables. For example, the DB2® family of RDBMS products (relational database management system) available from International Business Machines (IBM) provides a sophisticated commercial implementation of a relational database.

Tables in a relational database include one or more columns. Each column typically specifies a name and a data type (e.g., integer, float, string, etc.), and is used to store a common element of data. For example, in a table storing data related to patients, each patient might be referenced using a patient identification number stored in a "patient ID" column. Data from each row of this table is related to the same patient, and generally referred to as a "record." Tables that share at least one element in common (e.g., the patient ID column) are said to be "related." Additionally, tables without a common data element may be related through other tables that do share such elements.

A relational database query may specify which columns to retrieve data from, how to join columns from multiple tables, and conditions that must be satisfied for a particular data record to be included in a query result set. Current relational databases typically process queries composed in an exacting format specified by a query language. For example, the widely used query language SQL (short for Structured Query Language) is supported by virtually every database available today. An SQL query is composed from one or more clauses set off using specific keywords. However, composing a proper SQL query requires that a user understand the structure and content of the relational database (i.e., a schema of tables and columns) as well as the complex syntax of the SQL query language. This complexity often makes it difficult for average users to compose relational database queries.

Accordingly, query applications have been developed to simplify the process of composing a database query. Using such applications, a user may compose a desired query and submit it to the DBMS (database management system) for processing. In response, the DBMS processes the query and returns a set of query results. Typically, the query result includes a table populated with rows that satisfy conditions specified by the query. The query results are presented using an output format provided for a given query application. Additionally, some query applications allow users to specify a format or presentation style for a given query result.

In some cases, however, a user may not know how the results of a query will be used, and often the way query results are used will depend on the results themselves. Thus, the optimal output format may not be known in advance. For example, a user may review the results of a given query to determine whether they include any interesting or sought after data. The format best suited for such a review may be one that highlights different aspects of the query results, or organizes the rows of a query result table in a particular way. As another example, after reviewing a query result table organized in one format, a user may wish to use a statistical analysis program to process the query result. However, the format of the original query results may be incompatible with the format that such an analysis program might require. One approach for obtaining a query result in the desired format is for the user to perform the query a second time, using a different query application, or by specifying the desired output format, presentation or style.

This approach requires a user to execute the same query once for each desired result format, possibly using many query applications in the process. Besides being both redundant and organizationally difficult, this approach may cause considerable delay as interesting queries often require a substantial amount of time to complete. Thus, simply performing the query multiple times often becomes impractical. However, most of the query processing time occurs in evaluating the conditions specified for the query and not selecting the output format presentation or style to use in presenting a user with query result.

Accordingly, there remains a need for a query application that can present query results to a user in multiple desired formats without requiring that the same query be performed multiple times.

SUMMARY OF THE INVENTION

Embodiments of the invention provide a query application configured to return a polymorphic result set in response to processing a given database query. One embodiment of the invention includes a method for processing a database query. The method generally includes, executing the database query to retrieve a set of data records consistent with conditions specified by the database query, generating a first query result from the set of data records, organized according to a first output format mode, and generating at least a second query result from the set of data records, organized according to at least a second format mode. The method generally further includes, combining the first and second query results to form a polymorphic query result set and presenting the polymorphic query result set to a requesting entity, according to one of the first and second output format modes.

In a particular embodiment, the method may still further include receiving a request to view the polymorphic query result set according to another one of the first and second output format modes, and switching the presentation of the polymorphic query result to the requested output format mode.

Another embodiment of the invention includes a computer-readable medium containing a program which when executed by a processor, performs operations for processing a database query. The operations generally include executing the database query to retrieve a set of data records consistent with conditions specified by the database query, generating a first query result from the set of data records, organized according to a first output format mode, and generating at least a second query result from the set of data records, organized according to at least a second format mode. The operations may generally further include combining the first and second query results to form a polymorphic query result set, and presenting the polymorphic query result set to a requesting entity, according to one of the first and second output format modes.

Still another embodiment of the invention includes a computing device that includes a processor and a memory configured to store an application that includes instructions which, when executed by the processor, cause the processor to perform operations for processing a database query. The operations generally include executing the database query to retrieve a set of data records consistent with conditions specified by the database query, generating a first query result from the set of data records, organized according to a first output format mode, and generating at least a second query result from the set of data records, organized according to at least a second format mode. The operations may generally further include combining the first and second query results to form a polymorphic query result set; and presenting the polymorphic query result set to a requesting entity, according to one of the first and second output format modes.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this invention and should not, therefore, be considered limiting of its scope, for the invention may admit to other equally effective embodiments.

FIG. 6 illustrates an exemplary polymorphic query result set generated for an abstract query, according to one embodiment of the invention.

FIGS. 7A-7C illustrate a multiple output formats presented for the polymorphic query result set illustrated in FIG. 6, according to one embodiment of the invention.

DETAILED DESCRIPTION OF THE PREFERRED EMBODIMENTS

Figure 1:
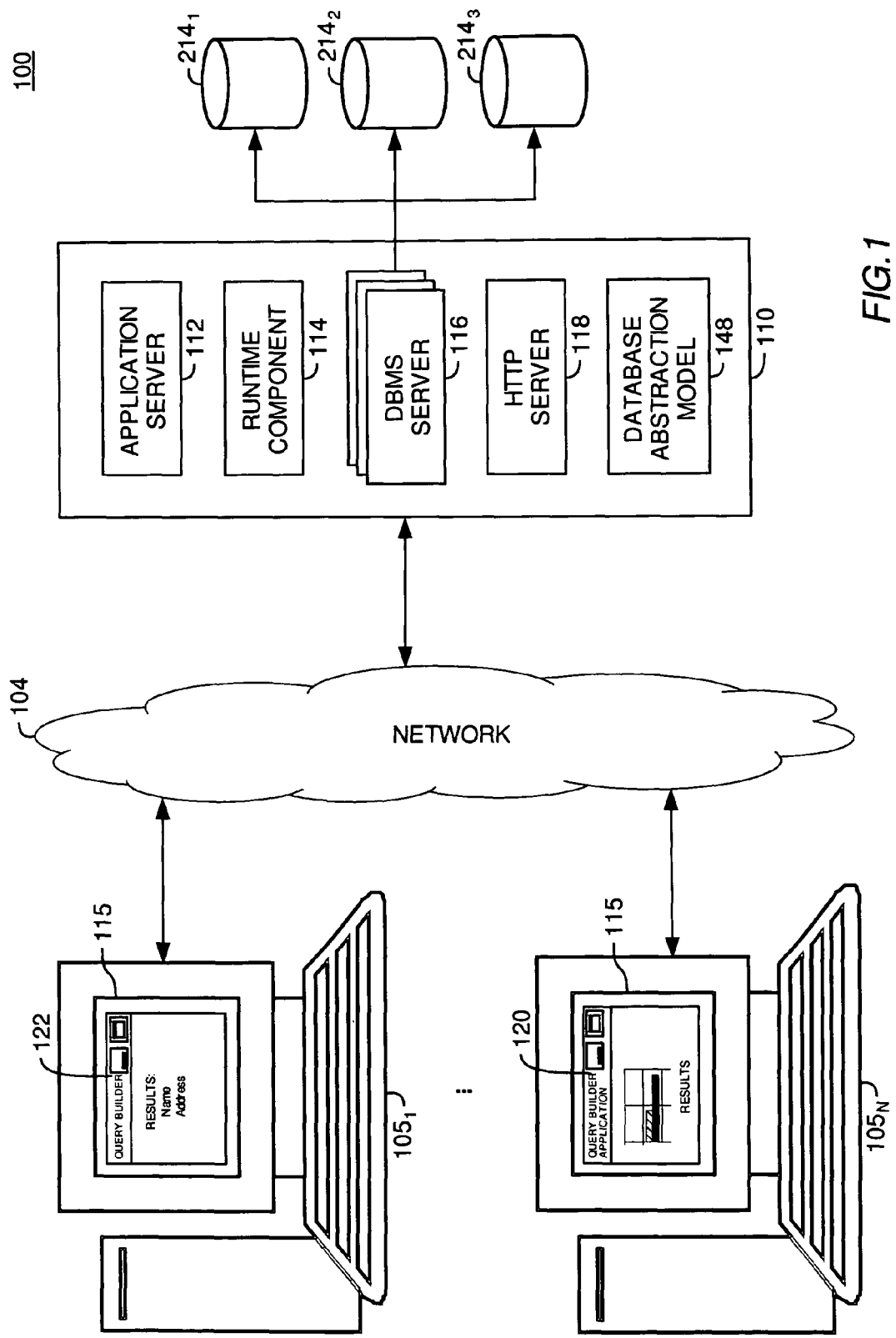
FIG. 1 illustrates an exemplary computing data communications environment, according to one embodiment of the invention.

The present invention provides a database query application configured to provide polymorphic query result sets. As the computationally expensive requirement of query processing typically occur while evaluating query conditions, these operations are performed once, according to one embodiment of the invention. At the same time, however, selecting output for different output formats, presentations or styles, may be performed multiple times. This allows the polymorphic query result set to be displayed in many output formats without requiring the computational expense of repeatedly performing the same query. The polymorphic query result set may be used to present the results of a database query in multiple output formats, styles, or arrangements, depending on the context and user preferences. Typically each output format provides a "rowset" that dictates the arrangement and content of each row for the given output format. In one embodiment, a user selects a desired output format as part of composing a database query. When the query result is generated, however, in addition to generating a rowset according to the selected output format, a rowset may be generated for each available output format. Initially, the query result is presented using the selected output format. Thereafter, a user may view the query result in other output formats, and the polymorphic result set allows the user to switch from one output format to another without having to re-execute the database query. Thus, users may be provided with a presentation of data in many formats. Doing so highlights different aspects of a query result, providing a richer user experience.

Further, applications that require the output of a database query to be provided in a given format may process data supplied from a polymorphic query result set. To do so, an output format is defined according to the requirements of such an application, and this format is selected for the database query. This rowset is supplied to a receiving application and appears no different than any other result set and may be treated as such. Because the polymorphic result set may be presented in many output formats, the same query result can be supplied to many applications, even though each may require a different output format to process a query result.

In one embodiment, a data abstraction model is used to provide a query application for users to compose a data query. As described in detail below, a data abstraction model provides a query building interface focused on the substantive content of a particular database, independently from the particular manner of data representation (e.g., a relational schema) used by the database. Thus, the data abstraction model exposes data to users in an intuitive manner, and users may compose and submit queries without an understanding of the underlying storage mechanism. Although embodiments of the invention are described relative to a data abstraction model, the invention is not limited to such, and the invention may be adapted to database query applications that do not rely on a data abstraction model.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in a variety of ways.

Moreover, examples described herein reference medical research environments. These examples are provided to illustrate embodiments of the invention, as applied to one type of data environment. The techniques of the present invention, however, are contemplated for any data environment including, for example, transactional environments, financial environments, research environments, accounting environments, legal environments, and the like. FIGS. 1-2 illustrate an embodiment of the database abstraction model constructed for an underlying physical data representation. FIGS. 3-7 then illustrate an example of a polymorphic query result generated for an abstract query.

The Database Abstraction Model: Physical View of the Environment

FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105 (e.g., a Linux® distribution, Microsoft Windows®, IBM's AIX® or OS/400®, FreeBSD, and the like) ("Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases $214_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. Typically, users compose an abstract query from the logical fields defined by the database abstraction model 148. Logical fields and access methods are described in greater detail below in reference to FIGS. 2A-2B.

In one embodiment, the runtime component 114 receives the abstract query and generates a resolved query of underlying physical databases 214. For example, the runtime component 114 may be configured to generate one or more SQL queries from an abstract query. The resolved queries generated by the runtime component 114 are supplied to DBMS server 116 for execution. Additionally, the runtime component 114 may be configured to return a polymorphic query result set used to present users with a query result, according to a selected output format.

The Database Abstraction Model: Logical View of the Environment

Figure 2A:
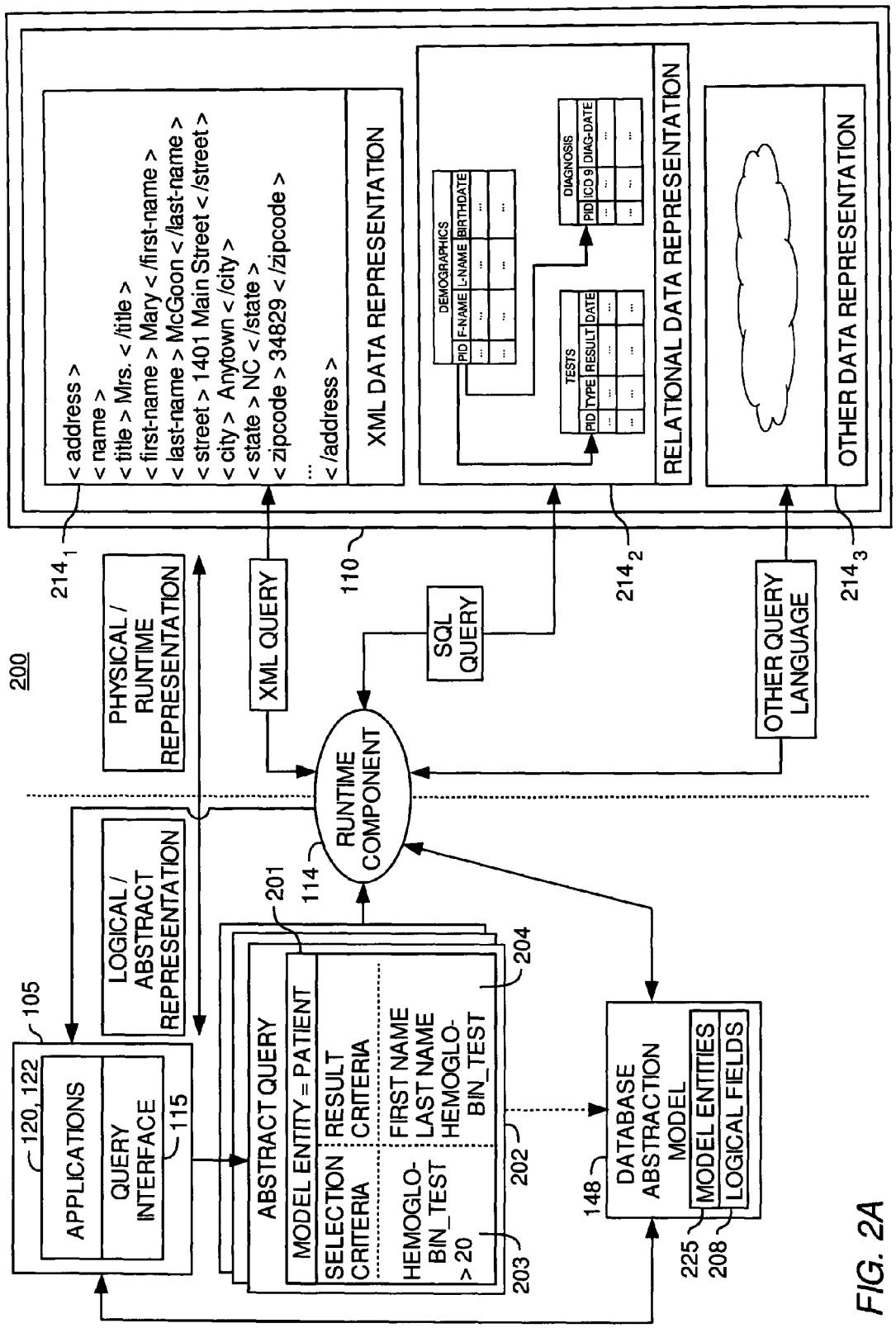
FIG. 2A illustrates a logical view of the database abstraction model constructed over an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database used to store the data (the right side of FIG. 2A).

In one embodiment, the database abstraction model 148 provides definitions for a set of logical fields 208 and model entities 225. Users compose an abstract query 202 by specifying selection criteria 203 and result fields 204. An abstract query 202 may identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the general focus of the abstract query 202 (e.g., a "patient", a "person", an "employee", a "test", a "facility" etc). Model entities are further described in commonly assigned, co-pending application Ser. No. 10/403,356, filed Mar. 31, 2003, titled "Dealing with Composite Data through Data Model Entities," incorporated herein by reference in its entirety.

Illustratively, abstract query 202 includes an indication of that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Result fields 204 indicates that data retrieved for this abstract query 202 includes data for the "name," "age," and "hemoglobin_test" logical fields 208.

In one embodiment, users compose an abstract query 202 using query building interface 115. The interface 115 may be configured to allow users to compose an abstract query 202 from the logical fields 208. The definition for each logical field 208 in the database abstraction model 148 specifies an access method. The access method defined for a logical field may be used to map from the logical view of data exposed to a user interacting with the interface 115 to the physical view of data used by the runtime component 114 to retrieve data from the physical databases 214. Thus, the runtime component 114 retrieves data from the physical database 214 by generating a resolved query (e.g., an SQL statement) from the abstract query 202.

Further, depending on the access method specified for a logical field, the runtime component 114 may generate a query of many different underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

Figure 2B:
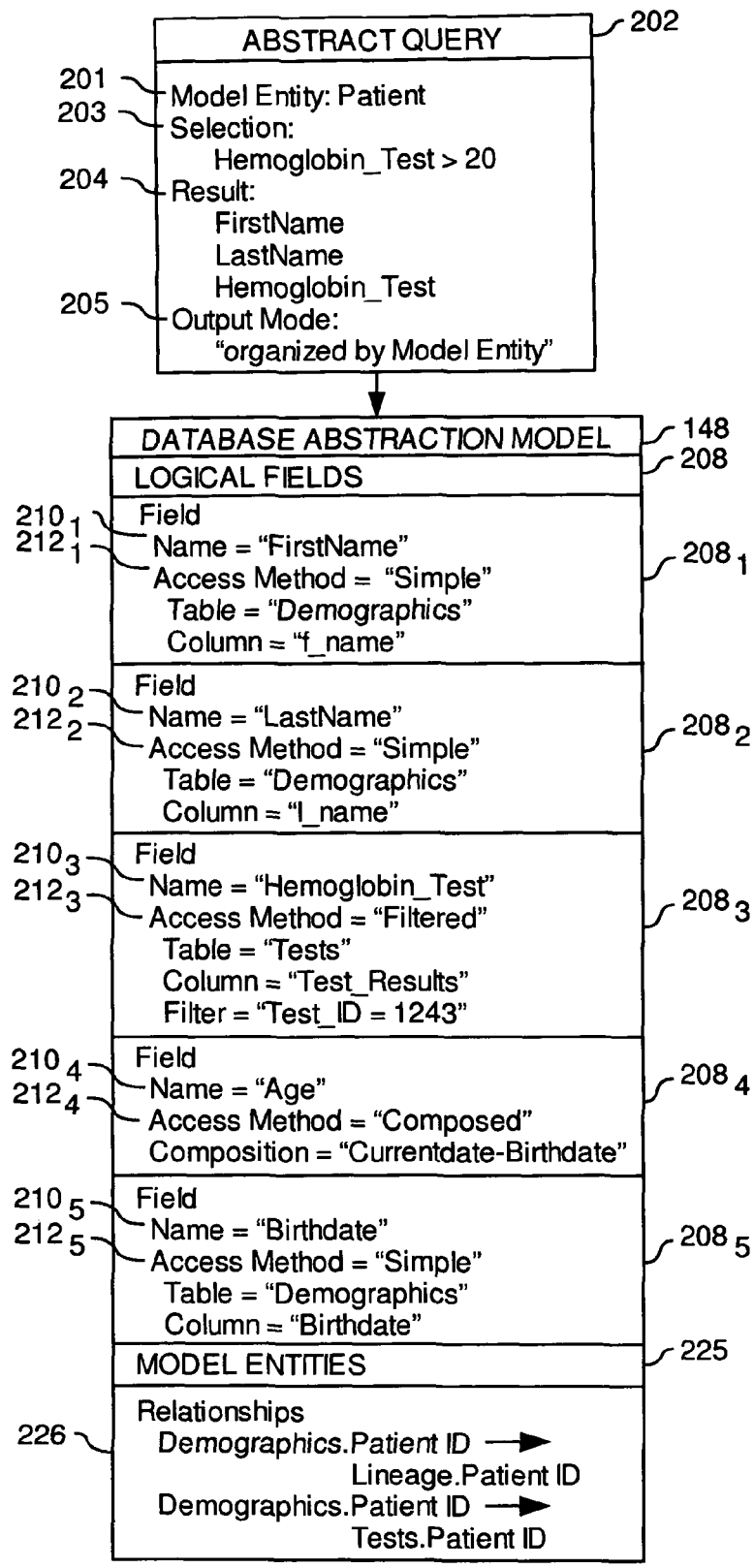
FIG. 2B illustrates an exemplary abstract query and database abstraction model, according to one embodiment of the invention.

FIG. 2B illustrates an exemplary abstract query 202, relative to the database abstraction model 148, according to one embodiment of the invention. The query includes selection criteria 203 indicating that the query should retrieve instances of the patient model entity 201 with a "hemoglobin" test value greater than "20." The particular information retrieved using abstract query 202 is specified by result fields 204. In this example, the abstract query 202 retrieves a patient's name and a test result value for a hemoglobin test. The actual data retrieved may include data from multiple tests. That is, the query results may exhibit a one-to-many relationship between a particular model entity and the query results. Illustratively, output format mode 205 specifies that query results should be presented in an output format labeled "organized by model entity."

An illustrative abstract query corresponding to abstract query 202 is shown in Table I below. In this example, the abstract query 202 is represented using eXtensible Markup Language (XML). In one embodiment, application 115 may be configured to generate an XML document to represent an abstract query composed by a user interacting with the query building interface 115. Those skilled in the art will recognize that XML is a well known markup language used to facilitate the sharing of structured text and information, other markup languages, however, may be used.

TABLE I

Abstract Query Example - XML

```
001  <?xml version="1.0"?>
002  <!--Query string representation: ("Hemoglobin_test > 20") -->
003  <QueryAbstraction>
004     <Selection>
005        <Condition>
006           <field="Hemoglobin Test" operator="GT" value="20"/>
007        </Condition>
008     </Selection>
009     <Results>
010        <Field name="FirstName"/>
011        <Field name="LastName"/>
012        <Field name="hemoglobin_test"/>
013     </Results>
014     <Entity name="patient" >
015        <FieldRef name="data://demographics/PID" />
016        <Usage type="query" />
017        </EntityField>
018     </Entity>
019     < OutputFormat Mode = "1">"organized by
      model entity"</OutputFormat>
020  </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the result fields 204 include a set of logical fields for which data should be returned. The actual data returned is consistent with the selection criteria 203. Line 13 identifies the model entity selected by a user, in this example, a "patient" model entity. Thus, the query results returned for abstract query 202 are instances of the "patient" model entity. Line 15 indicates the identifier in the physical database 214 used to identify instances of the model entity. In this case, instances of the "patient" model entity are identified using values from the "Patient ID" column of a demographics table. Line 19 includes a tag indicating the output mode selected for abstract query 202. The output mode indicates which one of the available output modes should be used to present a user with a polymorphic query result set.

Once composed, a user may submit an abstract query to runtime component 114 for processing. In one embodiment, the runtime component 114 may be configured to process the abstract query 202 by generating an intermediate representation of the abstract query 202, such as an abstract query plan. An abstract query plan is composed from a combination of abstract elements from the data abstraction model and physical elements relating to the underlying physical database. For example, an abstract query plan may identify which relational tables and columns are referenced by the access methods of the logical fields included in the abstract query. The runtime component may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004, which is incorporated by reference herein in its entirety.

FIG. 2B further illustrates an embodiment of a database abstraction model 148 that includes a plurality of logical field specifications $208_{1-5}$ (five shown by way of example). The access methods included in a given logical field specification 208 (or logical field, for short) provide mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical field (not shown) composed from the first name and last name logical fields $208_1$, and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

Model entity section 225 includes a definition for the "patient" model entity. Illustratively, the "patient" model entity 225 is defined with a name (for the model entity: "patient") and an instance identifier 215 used to distinguish between instances of the patient model entity. Model entity relationships section 226 identifies data available in database 214 that is related to instances of the "patient" model entity. For example, the first model entity relationship indicates that data from a row of the demographics table and the lineage table that share a common "patient ID" store data about the same instance of the "patient" model entity. Collectively, relationships section 226 defines the "universe" of data about the model entity captured by the underlying physical database 214.

The Database Abstraction Model: Polymorphic Result Sets

As described above, the database abstraction model provides a query environment where database users compose database queries according to a logical understanding of the data being queried and logical relationships among different data elements. Thus, users create queries about substantive entities (e.g., to find patients that fit a particular profile), instead of composing queries according to a particular physical representation (e.g. by specifying the tables and columns of a relational database). Because the database abstraction model 148 is not tied to the schema of the physical database 214 or the syntax of a particular query language, additional capabilities may be provided by the database abstraction model 148 without having to modify the underlying database.

Figure 3:
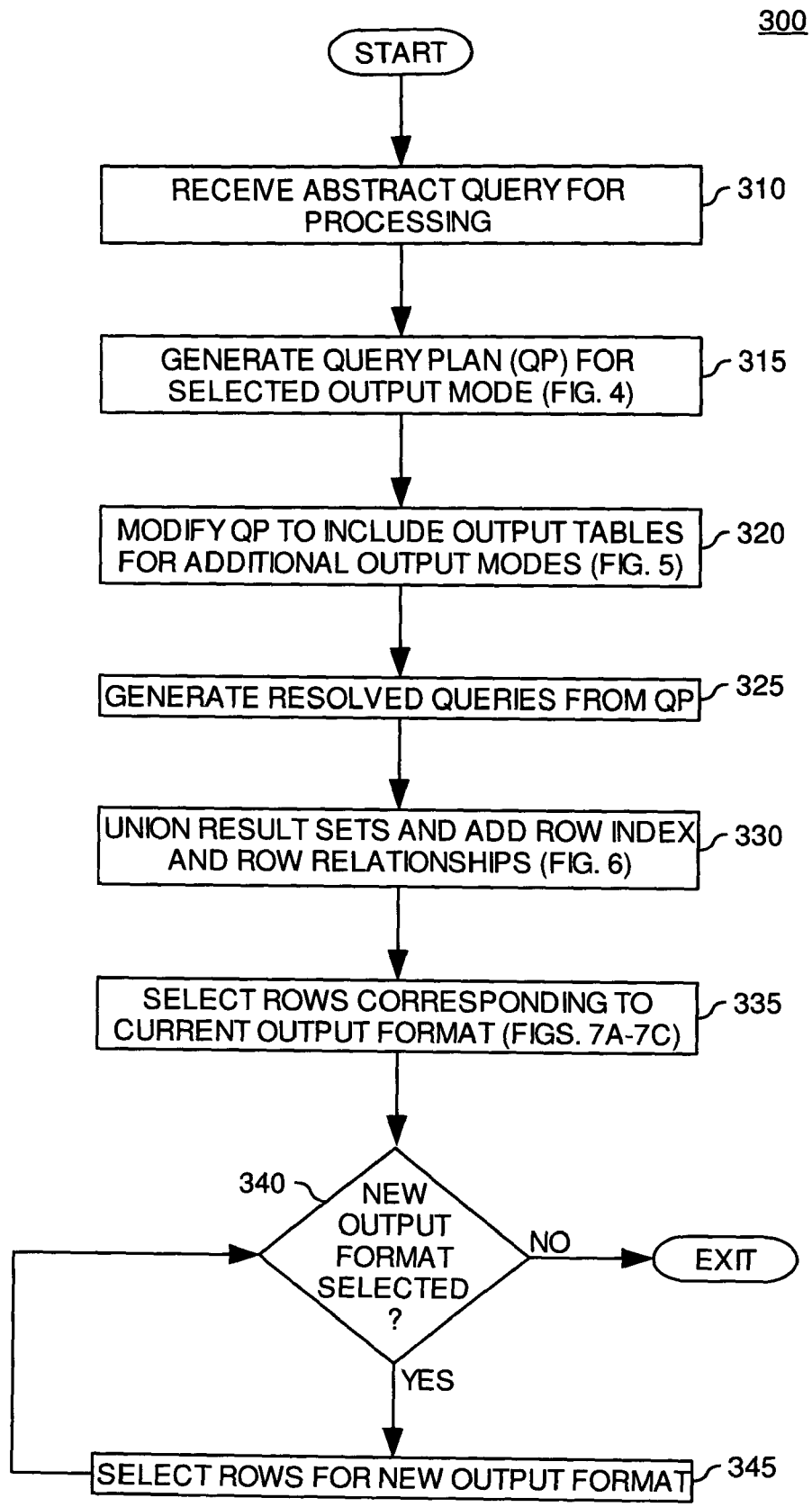
FIG. 3 illustrates a method for processing an abstract query to generate a set of polymorphic query results, according to one embodiment of the invention.

FIG. 3 illustrates a method 300 for generating a polymorphic query result set, according to one embodiment of the invention. The operations of the method 300 are described in conjunction with FIGS. 4-7. In one embodiment, the method 300 may be performed by the runtime component 114 after receiving an abstract query. Thus, as described above, a user may compose an abstract query using the logical fields provided by the database abstraction model 148, and once completed, may submit the query for processing. Accordingly, the method 300 begins at step 310 where the runtime component 114 receives an abstract query. The example described herein relies on the following abstract query:

TABLE II

Abstract Query Example

Find: patients with a hemoglobin test result greater than 30 or a glucose test result lower than 20;
Show: patient ID, hemoglobin test result, hemoglobin test date, glucose test result, glucose test date;
Output format: organize query results by patient model entity.

Each underlined phrase corresponds to a logical field provided by database abstraction model 148. The first element listed in Table II specifies the selection criteria 203 for this abstract query, along with the model entity that is the focus of this abstract query. The second element listed in Table II corresponds to result fields 204, and the third element listed in Table II specifies which output format 205 should be used to present query results generated for this abstract query.

Figure 4:
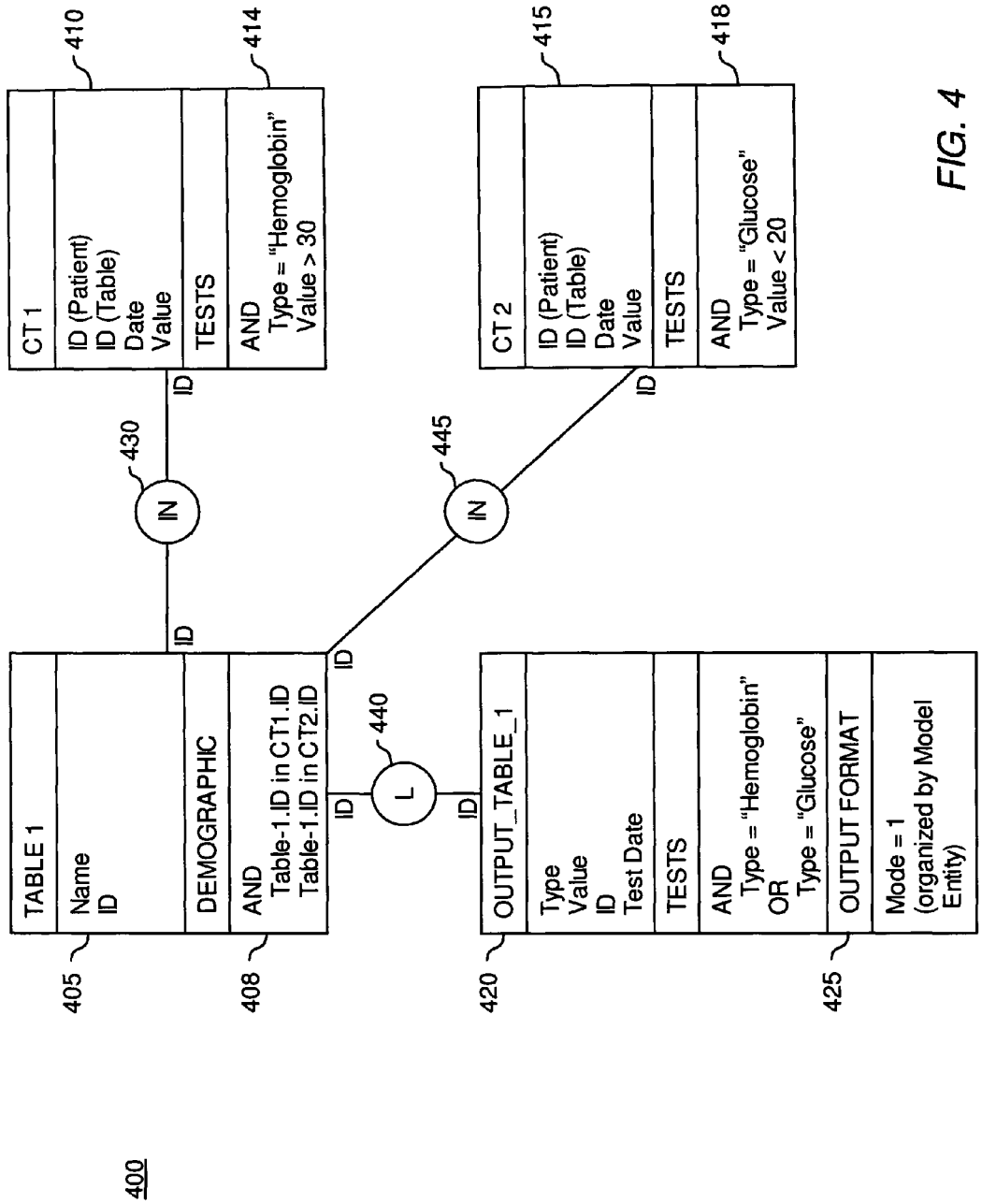
FIG. 4 illustrates an abstract query plan, according to one embodiment of the invention.

At step 315, the runtime component 114 generates an abstract query plan for the query received in the step 310. In one embodiment, an abstract query plan identifies the logical fields specified in an abstract query and corresponding elements of the underlying physical database (e.g., tables and columns). FIG. 4 illustrates an exemplary abstract query plan 400 corresponding to the abstract query illustrated in Table II. Abstract query plan 400 is represented as a graph of connected data nodes (405, 410, 415, and 420) connected by edges 430, 435, and 440.

Illustratively, abstract query plan 400 includes four table instance nodes. Each node defines a table that may be generated using records retrieved from an underlying physical database 214. For example, table instance 405 defines a table generated using data records retrieved for the "name" and "id" logical fields. In this example, these two logical fields map to a table titled "demographics" in database 214. The table instance 405 corresponds to the model entity specified by the abstract query in Table II; namely, the "patients" model entity. Records retrieved for table instance 405 satisfy conditions 408. In this case, the data records retrieved for table instance 405 include information for patients (represented by a patient ID) if a particular patient also has a record(s) in conditional table "CT1" 410 or in conditional table "CT2" 415.

The conditional table instances 410 and 415 define tables that may be used to evaluate conditions specified by the abstract query. In this example, conditional table instances 410 and 415 may be generated with data records used to evaluate which patients satisfy query conditions 203. Conditional table "CT1" 410 is constructed from an underlying "tests" table using data records retrieved for the "hemoglobin test result" and "hemoglobin test date" logical fields. Conditions 414 specify that data records for table instance 410 satisfy the "hemoglobin>30" condition specified by the abstract query in Table II. Similarly, conditional table 415 "CT2" is constructed using data records retrieved for the "glucose test result" and "glucose test date" logical fields. Data from this table is used to evaluate the corresponding "glucose<20" condition specified by the abstract query in Table II.

Output table 420 defines a table that may be generated to store query results presented to a user. That is, output table 420 includes data records presented to a user. Output table 420 describes the output for this abstract query plan. Specifically, output table 420 is constructed using data records retrieved for the "patient ID," "hemoglobin test result," "hemoglobin test date," "glucose test result" and "glucose test date" logical fields specified by the abstract query in Table II. Additionally, output format designation 425 specifies an output format used to format the data records returned to user. As illustrated, the output format 425 specifies that query results should be presented in an "organized by model entity" format. An example of a query result presented in this format is illustrated in FIG. 7A.

Additionally, table instances 405, 410, 415, and 420 are shown linked by join edges 430, 435, and 440. In one embodiment, each join edge specifies a relationship between the connected table instances. For example, join edge 430 specifies that data records retrieved for table instance 405 may be joined to records retrieved for table instance 410 using the "ID" fields and that an "INNER" join should be used to join records from each respective table. As one of ordinary skill in the art will recognize, a join operation combines records from two or more tables. For example, SQL provides two methods to join data from two tables: an INNER join and an OUTER join. SQL further subdivides OUTER joins into LEFT OUTER joins, RIGHT OUTER joins, and FULL OUTER joins. An INNER join determines the intersection between the two tables, using the specified join value. That is, a record must exist for the join value in both the right and left tables identified in a join expression to be included in the table resulting from an INNER join. A LEFT OUTER join limits query results to data records that exists from the table specified on the left side of a join expression without requiring the existence of records in the table specified on the right side of a join expression. Collectively, the nodes and edges of the abstract query plan 400 allow the runtime component to select data records instances of a model entity that meet criteria specified by the user and then select the requested data elements for those entities.

Figure 5:
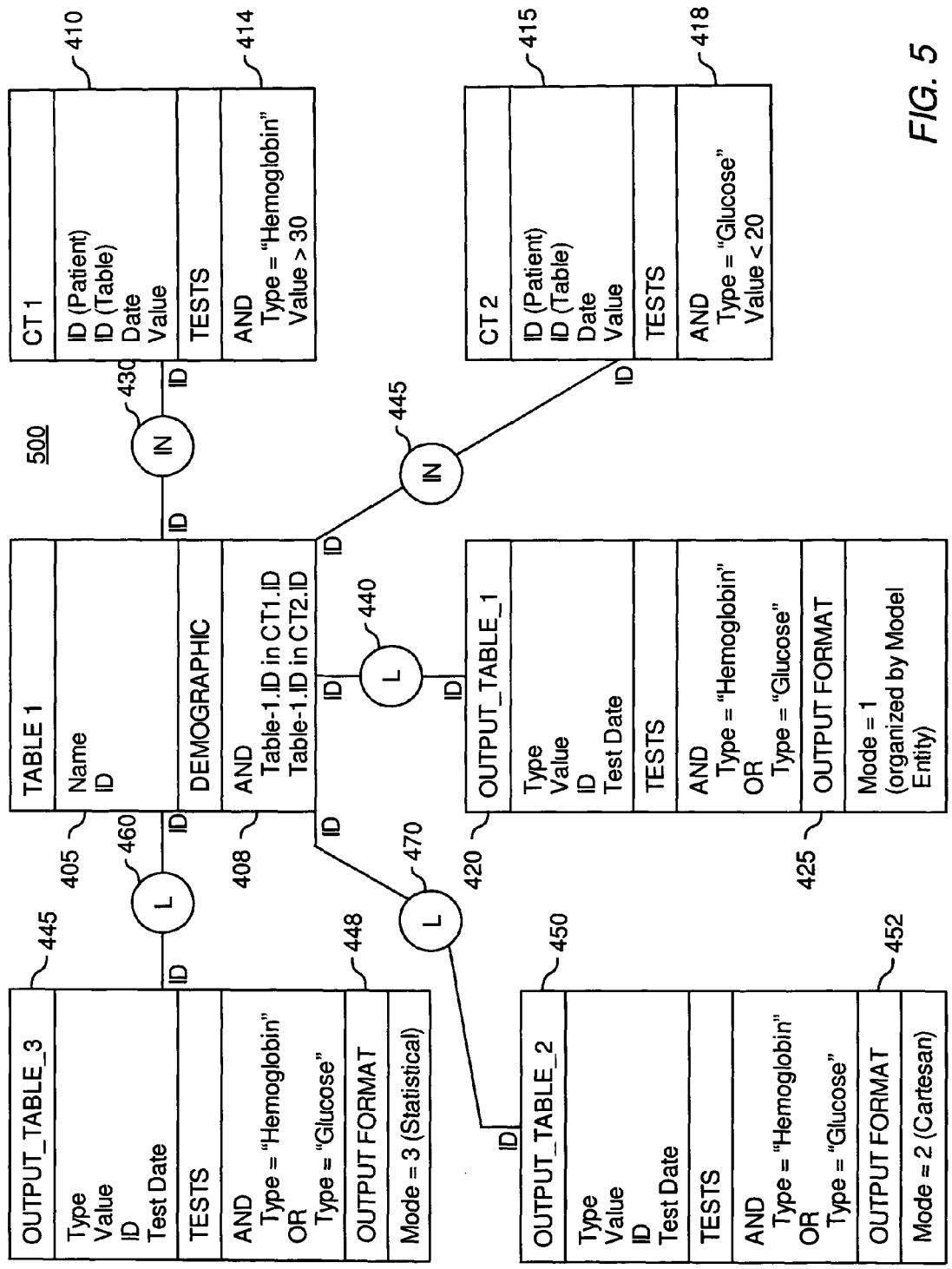
FIG. 5 illustrates a modification to the abstract query plan used to provide polymorphic result sets, according to one embodiment of the invention.

Returning to the method 300 illustrated in FIG. 3, at step 320, the abstract query plan is modified to include additional output table instances. In one embodiment, the abstract query plan may be modified to include an additional output table instance for each available output format. Each output format may organize the query results according to a different presentation style or arrangement. For example, different output formats may present the same query results using different orderings arrangements, or styles. However, output formats may specify more than just cosmetic differences. For example, an output format designed to display information to a user may represent numbers using a character data type. An output format used to provide data to a statistical analysis program, however, might represent the same query results using numerical data types (e.g., integers, or floating point numbers). The additional output tables are added to abstract query plan 500 to allow a polymorphic query result set to be generated. FIG. 5 illustrates abstract query plan 500 with two additional output tables 445 and 450, representing a "statistical" output format 448 and a "Cartesian" output format 452. Examples of query results presented in these formats are illustrated in FIGS. 7B and 7C.

At step 325, the runtime component 114 may generate one or more database queries from the abstract query plan. For example, each output table may be used to generate one or more "SELECT" SQL statements and each conditional table may be used to generate one or more "WHERE" statements, according to the access methods and logical fields specified by an abstract query plan. Further, when data from two or more tables is required, a join edge connecting two tables in the abstract query plan may be used to specify the correct join values and join relationships. Once generated, these queries may be processed by DBMS server 116 to retrieve a set of data records. At step 330, the query results retrieved for each output table in an abstract query plan may be combined to form a polymorphic result set. For example, the query results generated for the queries executed by the DBMS server 116 may be combined using an SQL "UNION" clause.

At step 330, information may be added to the polymorphic result set to identify which rows correspond to which output format, along with relationships between rows in different output formats. For example, FIG. 6 illustrates a polymorphic result set 600 generated using the abstract query plan 500. Illustratively, result set 600 includes a "result row" column (the first column) used to identify each row in the polymorphic result set 600, and an output "mode" column (the second column) used to associate each row with an output format. For example, rows 1 and 2 correspond to mode 1, the "organize by model entity" format, rows 3-10 correspond to mode 2, the "Cartesian" output format, and rows 11-18 correspond to mode 3, a "statistical analysis" output format.

In one embodiment, the interface 115 is configured to present the records from the polymorphic result set associated with the output format specified by the abstract query. Accordingly, at step 335, the rows from the polymorphic results set for the output format are selected and presented to a user as a row set object. For example, the polymorphic result set may be returned to interface 115 encapsulated by an output set wrapper. The wrapper provides an object-style interface to the polymorphic result set 600. This output set wrapper may perform one or more of several functions, according to various embodiments. In one embodiment, the wrapper allows a user to be presented only with the rows in the polymorphic result set that are associated with the selected output format. For example, the abstract query from Table II specifies the "organize by model entity" output format for the query results; accordingly, only rows 1 and 2 (which correspond to the output format "1") are presented as query results. The row set wrapper allows a user to switch between the output formats, by specifying a different output format. Additionally, for any row in an output set, the wrapper may identify which rows in one output format correspond to the rows in other output formats. In this way, a user may be presented with the same information in different formats, highlighting different aspects of the query results.

Referring again to the method 300 illustrated in FIG. 3, after displaying the rows in the output format specified by the abstract query, a user may select a new output format at step 340. If so, at step 345 the query interface 115 selects the rows from the polymorphic result set 600 for the selected output format and presents the query result in the selected output format. This process may be repeated for any number of output formats. Once the user has viewed the polymorphic result set in each desired output format, the method 300 terminates.

FIG. 7A illustrates the polymorphic query result set, wherein the rowset is being displayed according to the "organize by model entity" format. Using this format, each row includes all of the retrieved data records associated with a single patient. This format highlights the data available for a given individual, and a user presented with data in this format may not need to expressly correlate data records for a given individual. In contrast, FIG. 7B illustrates a second output format for polymorphic query result set 600. In this output format, the set of hemoglobin results and the set of glucose results have been combined to form a Cartesian product of the two sets. That is, each possible combination of a glucose test and hemoglobin test are represented by one of the rows. FIG. 7C illustrates a third exemplary output generated from the polymorphic query result set 600. Each row of the output format in FIG. 7C includes a single test result. The output formats illustrated in FIGS. 7A-7C are provided as examples of different output formats. Depending on context and user preferences, each of these output formats may be useful, or additional output formats may be defined to satisfy the output format requirements in an actual case.

Thus, embodiments of the invention provide a query application to return a single, polymorphic query result set that is capable of presenting query results in multiple output formats. Users of the result set are presented rows of the polymorphic result set associated with a selected output format. Additionally, users may switch from one output format to another. Thus, users may be provided with a presentation of data in many formats. Doing so highlights different aspects of a query result, providing a richer user experience.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing a first database query, comprising:
   executing the first database query to retrieve a set of data records consistent with conditions specified by the first database query;
   generating a first query result from the set of data records, organized according to a first output format mode;
   generating at least a second query result from the set of data records, organized according to at least a second output format mode;
   combining the first and second query results to form a polymorphic query result set;
   presenting the polymorphic query result set to a requesting entity, according to one of the first and second output format modes;
   receiving a request to view the polymorphic query result set according to another one of the first and second output format modes; and
   switching the presentation of the polymorphic query result to the requested output format mode.

2. The method of claim 1, wherein the first and second output format modes each specify a different presentation style, arrangement or format for the retrieved set of data records.

3. The method of claim 1, wherein at least one of the first and second output format modes is used to format the set of data records according to the requirements of a data processing application.

4. The method of claim 1, wherein the database query includes a selection of one of the first or second output format modes that should be used to present the polymorphic query result set to the requesting entity.

5. The method of claim 1, wherein the database query comprises an abstract query composed according to a database abstraction model, wherein the database abstraction model defines a plurality of logical fields, and wherein each logical field specifies an access method for accessing data in the database corresponding to the logical field; wherein processing the database query to retrieve a set of data records comprises:
   transforming the abstract query into a query consistent with a particular physical data representation used by an underlying physical database; and issuing the transformed queries to the underlying physical database.

6. The method of claim 1, wherein the polymorphic query result set includes an indication of a given data record in the first query result that corresponds to the given data record in the second query result.

7. A computer-readable storage medium containing a program which when executed by a processor, performs operations for processing a first database query, including the steps of:
  executing the first database query to retrieve a set of data records consistent with conditions specified by the first database query;
  generating a first query result from the set of data records, organized according to a first output format mode;
  generating at least a second query result from the set of data records, organized according to at least a second output format mode;
  combining the first and second query results to form a polymorphic query result set;
  presenting the polymorphic query result set to a requesting entity, according to one of the first and second output format modes;
  receiving a request to view the polymorphic query result set according to another one of the first and second output format modes; and
  switching the presentation of the polymorphic query result to the requested output format mode.

8. The computer-readable storage medium of claim 7, wherein the first and second output format modes each specify a different presentation style, arrangement or format for the retrieved set of data records.

9. The computer-readable storage medium of claim 7, wherein at least one of the first and second output format modes is used to format the set of data records according to the requirements of a data processing application.

10. The computer-readable storage medium of claim 7, wherein the database query includes a selection of one of the first or second format modes that should be used to present the polymorphic query result set to the requesting entity.

11. The computer-readable storage medium of claim 7, wherein the database query comprises an abstract query composed according to a database abstraction model, wherein the database abstraction model defines a plurality of logical fields, and wherein each logical field specifies an access method for accessing data in the database corresponding to the logical field; wherein processing the database query to retrieve a set of data records comprises:
  transforming the abstract query into a query consistent with a particular physical data representation used by an underlying physical database; and
  issuing the transformed queries to the underlying physical database.

12. The computer-readable storage medium of claim 7, wherein the polymorphic query result set includes an indication of a given data record in the first query result that corresponds to the given data record in the second query result.

13. A computing device, comprising:
  a processor; and
  a memory configured to store an application that includes instructions which, when executed by the processor, cause the processor to perform operations for processing a first database query, comprising:
    executing the first database query to retrieve a set of data records consistent with conditions specified by the first database query;
    generating a first query result from the set of data records, organized according to a first output format mode;
    generating at least a second query result from the set of data records, organized according to at least a second output format mode;
    combining the first and second query results to form a polymorphic query result set;
    presenting the polymorphic query result set to a requesting entity, according to one of the first and second output format modes;
    receiving a request to view the polymorphic query result set according to another one of the first and second output format modes; and
    switching the presentation of the polymorphic query result to the requested output format mode.

14. The computing device of claim 13, wherein the first and second output format modes each specify a different presentation style, arrangement or format for the retrieved set of data records.

15. The computing device of claim 13, wherein at least one of the first and second output format modes is used to format the set of data records according to the requirements of a data processing application.

16. The computing device of claim 13, wherein the database query includes a selection of one of the first or second format modes that should be used to present the polymorphic query result set to the requesting entity.

17. The computing device of claim 13, wherein the database query comprises an abstract query composed according to a database abstraction model, wherein the database abstraction model defines a plurality of logical fields, and wherein each logical field specifies an access method for accessing data in the database corresponding to the logical field; wherein processing the database query to retrieve a set of data records comprises:
  transforming the abstract query into a query consistent with a particular physical data representation used by an underlying physical database; and
  issuing the transformed queries to the underlying physical database.

18. The computing device of claim 13, wherein the polymorphic query result set includes an indication of a given data record in the first query result that corresponds to the given data record in the second query result.

* * * * *